March 3, 1964 H. H. WIEDER 3,123,723

STAIRCASE WAVE GENERATOR EMPLOYING TWO FOUR-LAYER DIODES

Filed Aug. 23, 1962 3 Sheets-Sheet 1

HARRY H. WIEDER
*INVENTOR.*

BY J. M. St. Amand

ATTORNEY

HARRY H. WIEDER
*INVENTOR.*

BY J. M. St. Amand

ATTORNEY

HARRY H. WIEDER
*INVENTOR.*

BY J. M. St. Amand

ATTORNEY

United States Patent Office 3,123,723 Patented Mar. 3, 1964

3,123,723
STAIRCASE WAVE GENERATOR EMPLOYING TWO FOUR-LAYER DIODES

Harry H. Wieder, Riverside, Calif., assignor to the United States of America as represented by the Secretary of the Navy Filed Aug. 23, 1962, Ser. No. 219,084
7 Claims. (Cl. 307—88.5)
(Granted under Title 35, U.S. Code (1952), sec. 266)

The invention herein described may be manufactured and used by or for the Government of the United States of America for governmental purposes without the payment of any royalties thereon or therefor.

The present invention relates to electrical generators of the staircase type and more particularly to a simple, stable staircase generator to be used either in the free running state, or alternatively, to be triggered from an external pulse source and synchronized with that source. In addition to the conventional applications of frequency division and counting, the circuit of the present invention may be employed for generating a precisely controlled digital phase shift with respect to a reference signal. By circuit design, the time duration of each staircase step may be made to increase at a predetermined rate with respect to the duration of preceding steps.

Older methods used for building staircase wave generators are:

(*a*) A vacuum tube circuit shown and described by F. E. Terman, in Radio Engineering, McGraw-Hill Book Co., 1947, page 606. This circuit requires a vacuum tube pentode amplifier which acts as a current generator and is driven beyond cutoff on the negative peaks of an alternating input signal charging two capacitors in series in such a way that the sum of the potential drops across the capacitors is equal to the plate supply voltage. On the positive peak of the input signal, the first capacitor $C_1$ is discharged through the shunt diode $T_2$; however, the charge on the second capacitor $C_2$ is prevented from discharging by the series diode $T_3$. Accumulation of charge on the second capacitor $C_2$ continues until the potential across this capacitor reaches the breakdown potential of the gas triode $T_4$ at which time the circuit is reset to its original state. These circuits are very stable under the conditions described by Terman, they do suffer, however, from the disadvantages all vacuum tubes have in common—they require both a filament and plate supply and are quite inefficient in terms of primary power. The separate bias sources for the pentode and the gas tube are encumbrances which are not necessary in the present invention.

(*b*) A transistor circuit for the generation of staircase waves as described in the General Electric Transistor Manual (1959) edited by their Semiconductor Products Department, G. E. Charles Building, Liverpool, New York, page 143. This circuit uses two silicon unijunction transistors and one PNP germanium transistor in accordance with the schematic diagram shown. The unijunction transistor $Q_1$ operates as a free running oscillator generating negative pulses across resistor $R_2$. The base voltage of the PNP transistor $Q_2$ is controlled by resistor $R_2$ consequently current pulses are produced at the collector of PNP transistor $Q_2$ which charge condenser $C_1$ in steps. When the voltage across condenser $C_1$ reaches the firing voltage of the second unijunction transistor $Q_3$, the latter fires discharging condenser $C_1$ and resetting the circuit. The number of steps per cycle is controlled by resistor $R_2$ while resistor $R_1$ controls the number of cycles. The peak to peak output voltage obtainable is 10 volts for a 20 volt supply voltage, the circuit is very efficient although the temperature dependence is primarily determined by the germanium transistor whose replacement by a similar silicon unit would be costly. This circuit can be adjusted to provide step frequencies from 100 c.p.s. to 2 kc. and the number of cycles may be adjusted from one to several hundred. There are, however, no provisions for synchronizing it with an external source nor for triggering or driving the circuit by an external pulse generator.

(*c*) Still another frequency divider circuit is described and shown in "Notes on the Application of the Silicon Unijunction Transistor" by the General Electric Products Department, February 1959, page 74. The NPN input transistor $Q_1$ has positive pulses applied to its base. Each pulse discharges condenser $C_1$ through the transistor $Q_1$. At the end of the pulse, charge flows into condenser $C_1$ through resistor $R_1$ and an equivalent amount of charge flows into condenser $C_2$ through diode $D_2$ which serves a a blocking path for the discharge of condenser $C_2$. The approximate division ratio is stated to be proportional to $(C_1+C_2)/C_1$. When the voltage build-up across the unijunction transistor $Q_2$ reaches its firing voltage, the cycle terminates and the circuit is reset. This circuit although simpler than that described immediately above is somewhat limited in operational frequency primarily by the reverse leakage impedances of diodes $D_1$ and $D_2$. Also, since no internal provision exists for generating the triggering pulses, an external pulse generator must be employed. The unijunction transistors are very useful devices for such frequency division circuits, the relatively low interbase leakage resistance of these devices (of the order of 5K to 10K ohms) produces a behavior considerably short of that of an ideal switch. It will be shown subsequently that this is not the case for the four layer PNPN diodes.

The disadvantages of the older methods of staircase generation are the following:

(*a*) In the case of vacuum tubes, there are a large number of circuit components, relative waste and inefficiency in terms of the primary energy source, limited life of the tubes which require in addition to the plate and filament supplied and also a D.C. bias supply.

(*b*) Unijunction transistor circuits on the other hand, while lacking the disadvantages of vacuum tubes nevertheless have a greater temperature sensitivity especially when used on conjunction with germanium transistors or diodes. These transistors have a relatively low interbase resistance and therefore do not act as ideal switches in the charge transfer operation required of the circuit. These circuits still require too many components. Unijunction transistors are low voltage devices and thus limit the output voltage of staircase generators in which they are employed also restricting the number of steps per cycle assuming a minimum voltage amplitude per step.

The present invention overcomes the disadvantages of the older staircase wave generators, requires only one power supply source with very small current drain and fewer component parts using pnpn diodes.

It is an object of the invention to provide a novel staircase wave generator using pnpn diodes.

Another object of the invention is to provide a driven or triggered solid state staircase wave generator.

A further object of the invention is to provide a novel staircase wave generator using variable step duration for obtaining discrete digital phase shift.

Other objects and many of the attendant advantages of this invention will become readily appreciated as the same becomes better understood by reference to the following detailed description when considered in connection with the accompanying drawings wherein:

FIG. 1 shows a circuit diagram of an embodiment of the present invention.

FIGS. 2*a–e* shows various forms of the output of the staircase wave generator of the present invention made by varying the time duration of each step.

The construction of the present invention is primarily dependent upon the special characteristics of the pnpn four layer silicon diode, a device whose operation approximates closely that of an ideal switch. In the open circuit state its impedance is of the order of $10^8$ ohms while in the closed circuit state its impedance is less than 10 ohms. The impedance depends upon the potential applied to the device and in operation it is similar to the behavior of thyratrons or solid state devices dependent upon charge carrier multiplication by avalanche processes. The breakover voltage $V_b$ is defined here as the potential that will trigger the diode into its low impedance state while the recovery voltage $V_S$ is the potential that will return the diode to its high impedance state. Further details on the operation of these devices are contained in "Application Data" (December 1958), Shockley Transistor Corporation, and W. Shockley, "Electronic Industries & Tele-Tech.," August 1957. A typical staircase generator such as described by the invention is shown in the schematic diagram of FIG. 1. Capacitor $C_1$ is chosen to be much smaller than $C_2$, for example: in experiments, $$C_1=2\times10^{-8}$$

farads while $C_2=10^{-6}$ farads. The pnpn diode $D_1$ has a breakover potential $V_b=40\pm10\%$ volts, twice that of diode $D_2$ whose $V_b=20\pm10\%$ volts. The supply voltage V is larger than the sum of the breakover voltages of the two diodes, in our case, $V=112.5$ volts. The load impedance, $R_L$, is $10^7$ ohms or greater. The current limiting resistors are respectively $R_2=10^2$ ohms and $R_3=10^3$ ohms. All values are given by way of example.

Let the switch SW be closed, the potential across diode $D_1$ is then higher than the breakover potential $V_b$, hence diode $D_1$ switches to its low impedance state. Diode $D_2$, shunted by capacitor $C_2$ remains open. Therefore capacitor $C_1$ charges in series with capacitor $C_2$ until the voltage across diode $D_1$ drops below its sustaining value $V_S$ at which time diode $D_1$ switches back to its high impedance open circuit condition. Thus a charge is trapped on capacitor $C_2$ producing a voltage $v_2$ which remains essentially constant due to the large time constant $R_LC_2\cong10^7\times10^{-6}=10$ seconds. On the other hand, the charge on capacitor $C_1$ discharges through resistor $R_1$ in a much shorter time interval, with $R_1=10^5$ ohms, $$R_1C_1=10^5\times2\times10^{-8}=2\times10^{-3}$$

seconds. As capacitor $C_1$ discharges, the voltage across diode $D_1$ rises until its breakover potential is reached at which time diode $D_1$ switches on and the cycle repeats itself.

Figure 2:
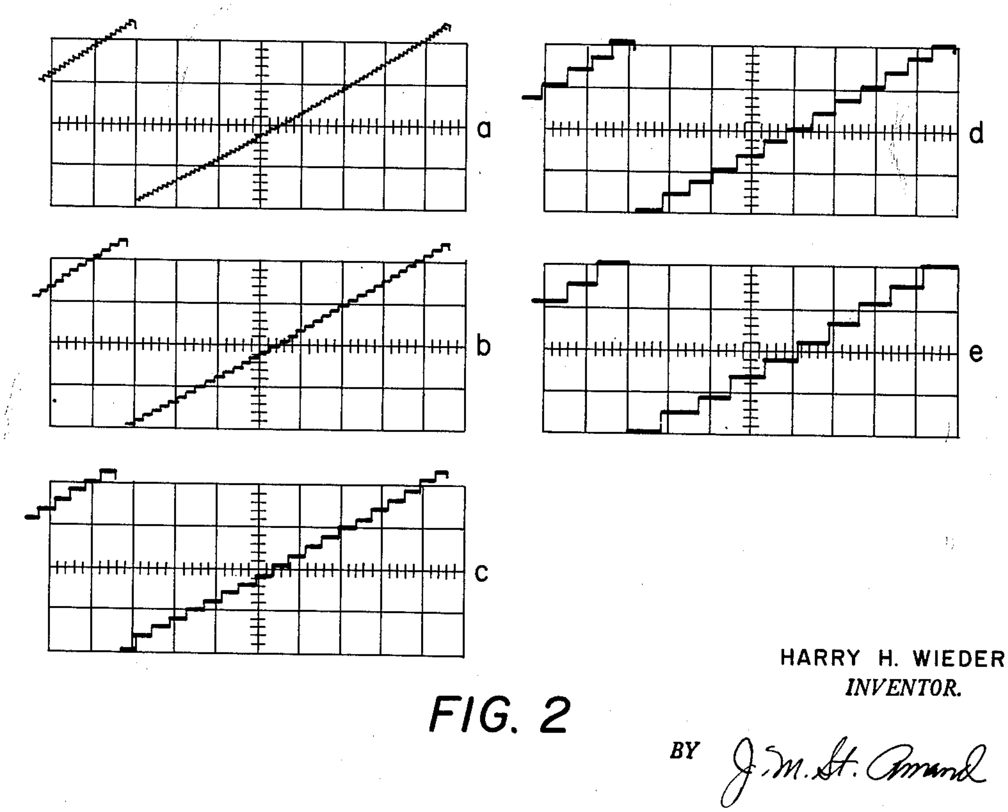

During each charging cycle, an increment of charge is added to capacitor $C_2$ in a discrete step giving rise to a potential rise in the form of a staircase as shown in the waveforms of FIG. 2. The ratio of $C_1$ to $C_2$ controls the number of steps in the staircase when the other circuit parameters are held constant. When the reverse breakdown voltage $V_R$ of diode $D_2$ is reached by the staircase potential across capacitor $C_2$, this diode switches to its low impedance state; consequently capacitor $C_2$ is discharged and the circuit is reset to its original condition. The function of resistor $R_2$ is to limit the discharge current below the peak pulse current which will damage the junctions and destroy the diode. It is clear therefore from the above description that the pnpn diodes must behave in many respects like ideal switches. Furthermore, the circuit behavior may be approximated by a current generator which charges capacitor $C_1$ in series with capacitor $C_2$ after which, being isolated from each other, the charge on capacitor $C_1$ is removed while the charge on capacitor $C_2$ is maintained constant. Each subsequent charging thus adds an increment of charge to capacitor $C_2$ hence a step increase in potential which builds up across capacitor $C_2$ until the circuit is reset to its original state by the discharge of capacitor $C_2$ and the start of another cycle.

Figure 1:
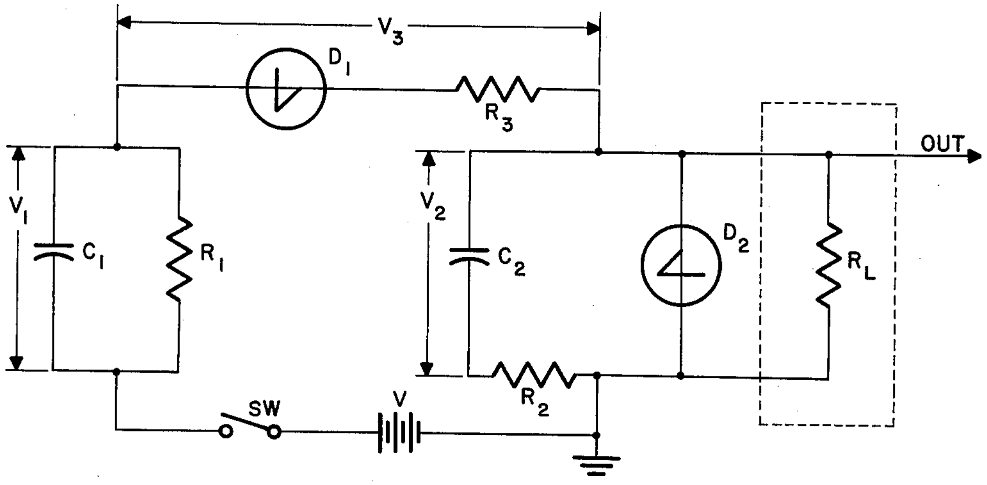

A simple analysis of the operation of such a staircase wave generator as this may be performed with references to the circuit schematic of FIG. 1. Let the resistance of diode $D_1$ and diode $D_2$ in their low impedance state be much smaller than resistor $R_3$, and let diodes $D_1$ and $D_2$ be considered as open switches in their high impedance condition. Then:

$$v_2=V-(v_1+v_3)\left[C_1\left(\frac{dv_1}{dt}\right)+\frac{v_1}{R_1}\right]=i$$

$$i=\frac{v_2}{R_3}=C_2\left(\frac{dv_2}{dt}\right) \qquad (1)$$

therefore upon performing the proper substitutions and solving for $v_2$:

$$v_2=V-v_1-R_3\left[C_1\left(\frac{dv_1}{dt}\right)+\frac{v_1}{R_1}\right] \qquad (2)$$

and:

$$\frac{dv_2}{dt}=-\left(\frac{dv_1}{dt}\right)-R_3C_1\left(\frac{d^2v}{dt^2}\right)-\frac{R_3}{R_1}\left(\frac{dv_1}{dt}\right)$$

$$C_1\left(\frac{dv_1}{dt}\right)+\frac{v_1}{R_1}=-C_2\left(\frac{dv_1}{dt}\right)-R_3C_1C_2\left(\frac{d^2v_1}{dt^2}\right)-\frac{R_2C_2}{R_1}\left(\frac{dv_1}{dt}\right) \qquad (3)$$

Equation 3 yields the simple differential equation:

$$\frac{d^2v_1}{dt^2}+\left[\frac{C_1+C_2}{C_1C_2R_3}+\frac{1}{R_1C_1}\right]\left(\frac{dv_1}{dt}\right)+\frac{v_1}{R_1R_3C_1C_2}=0 \qquad (4)$$

now $$\frac{C_1C_2}{C_1+C_2}$$

is the series capacitance $C_S$ which for values of $C_1 \ll C_2$ is approximately $C_1$. Let $R_1C_1=\tau_1$ and $R_3C_1=\tau_2$ while $R_1C_2=\tau_3$ therefore Equation 4 is:

$$\frac{d^2v_1}{dt^2}+\left[\frac{1}{\tau_2}+\frac{1}{\tau_1}\right]\left(\frac{dv_1}{dt}\right)+\frac{v_1}{\tau_2\tau_3}=0 \qquad (5)$$

The simplest situation is obtained if $1/\tau_2 \gg 1/\tau_1$, therefore (5) may be written as:

$$\left(\frac{d^2v_1}{dt^2}\right)+\frac{1}{\tau_2}\left(\frac{dv_1}{dt}\right)+\frac{v_1}{\tau_2\tau_3}=0 \qquad (6)$$

Equation 6 is a second order differential equation having a standard solution which may be further simplified provided that: $(1/\tau_2)^2 \gg (4/\tau_2\tau_3)$. In that case, solving for $v_1$ one obtains:

$$v_1=k_1+k_2e^{-\frac{t}{\tau_2}} \qquad (7)$$

Therefore $(dv/dt)=-(k_2/R_3C_1)\exp(-t/R_3C_1)$ and since $v_2=v_1[1+(R_3/R_1)]-R_3C_1(dv_1/dt)$ and for $(R_3/R_1) \ll 1$:

$$v_2=V-v_1-R_3C_1\left(\frac{dv_1}{dt}\right) \qquad (8)$$

and substituting Equation 7 into 8:

$$v_2=V-[k_1+k_2\exp(-t/R_3C_1)]-k_2\exp(-t/R_3C_1) \qquad (9)$$

therefore:

$$v_2=V-k_1 \qquad (10)$$

and from 7 at $t=o$:

$$v_1(o)=k_1+k_2 \qquad (11)$$

Equations 7, 10 and 11 may now be used to define the charging process while $D_1$ is switched on. During the charging process the voltage across $R_1C_1$ changes as: $\Delta v_1 = v_1(\alpha) - v_1(o)$ where $v_1(o)$ is the potential at start and $v_1(\alpha)$ is the potential at the end of the charging cycle. In general:

$$v_1(t) = (V - v_2)[1 - \exp(-t/R_3C_1)] + V_1 \exp(-t/R_3C_1) \qquad (12)$$

Let $\Delta v_2 = S$ be the height of each stair at the end of each charging cycle. Then since $C_1\Delta v_1 = C_2\Delta v_2$:

$$S = \left(\frac{C_1}{C_2}\right)[v_1(\alpha) - v_1(o)] \qquad (13)$$

Note that $D_1$ switches on when $v_3 = V_b$ and switches off when $v_3 = v'$ hence $\Delta v_3 = V_b - v'$, letting the subscript $i$ and $f$ refer respectively to the initial and final voltages:

$$\begin{aligned} v_{1f} - v_{1i} &= \Delta v_1 = v_1(\alpha) - v_2(o) \\ v_{2f} - v_{2i} &= \Delta v_2 = (n+1)S - nS \\ v_{3i} - v_{3f} &= \Delta v_3 = v_b - v' \end{aligned} \qquad (14)$$

Adding the components of Equation 14 while noting that $v_{1f} + v_{2f} + v_{3f} = v_{1i} + v_{2i} + v_{3i} = V$ yields:

$$\Delta v_2 = \Delta v_1 + \Delta v_2 \qquad (15)$$

but $\Delta v_2 = S = (C_1/C_2)\,\Delta v_1$, therefore:

$$\Delta v = \frac{SC_2}{C_1} + S = S\left(\frac{C_2}{C_1} + 1\right) \qquad (16)$$

hence:

$$S = \Delta v\left[\frac{C_1}{C_1 + C_2}\right] \qquad (17)$$

The step height is thus given by:

$$S = \frac{C_1}{C_1 + C_2}(v_b - v') \qquad (18)$$

The duration of the charging cycle is independent of the number of steps if equal amounts of charge are added to $C_2$ during each charging cycle. This may be shown under the following conditions: Let $v_1(\alpha)$ be the potential on $C_1$ at the end of the $n$th charging cycle and $v_1(o)$ be the charge on $C_2$ at the start of the $n$th charging cycle Since:

$$v_1(\alpha) = (V - nS)[1 - \exp(-\alpha/R_3C_1)] + v_1(o)\exp(-\alpha/R_3C_1) \qquad (19)$$

it follows that:

$$v_1(\alpha) - v_1(o) = \Delta v_1 = [1\text{-}\exp(-\alpha/R_3C_1)][V - nS - v_1(o)] \qquad (20)$$

but $V - v_1(o) = v_2(o) + v_3(o) = nS + V_b$, therefore (20) becomes:

$$v_1 = [1 - \exp(-\alpha/R_3C_1)]V_b \qquad (21)$$

also since $$\Delta v_1 = \frac{C_1}{C_1 + C_2}(v_b - v') \text{ and } C_1 \ll C_2$$

$$\Delta v_1 - (v_b - v') \qquad (22)$$

Therefore (21) may be written as:

$$\alpha = (R_3C_1)\log\left(\frac{v'}{v_b}\right) \qquad (23)$$

It is seen therefore that the charging cycle is dependent only upon circuit parameters and does not vary during the staircase cycle. Its duration, $\alpha$, is given by Equation 23.

At the end of the charging cycle, the voltage across $D_1$ having dropped below $V_S$, this diode switches off and the charge trapped on $C_1$ discharges with a time constant $R_1C_1$. This in turn causes the potential across $D_1$ to rise once again until it reaches the breakover potential. $D_1$ is then switched into its low impedance state and the charging process resumes. The duration of the discharge portion of the step may be calculated as follows: 1st the time at which $D_1$ is triggered into conduction be $\beta$ and the voltage across $C_1$ at that instant be $v_1(\alpha)e^{-\beta/R_1C_1}$ where $v_1(\alpha)$ is the potential left on $C_1$ at the end of the charging cycle. Then at turn-on:

$$V_b = V - V - [v_1(\alpha)]\exp(-\beta/R_1C_1) - nS \qquad (24)$$

but $v_1(\alpha) = [V - (n-1)S - V_b\exp(-\alpha/R_3C_1)]$ and since $\exp(-\alpha/R_3C_1) = \gamma$ with $\gamma$ a constant determined from Equation 23, Equation 24 may be written as:

$$v_b = V - nS - V(n-1)S - \gamma v_b\exp(-\beta/R_1C_1) \qquad (25)$$

solving for $\beta$:

$$\beta = -RC\log\left[\frac{V - V_b - nS}{V - \gamma v_b - (n-1)S}\right] \qquad (26)$$

From Equation 26 it is to be seen tha the duration of each successive step increases continuously. Letting $(V - V_b)$ be a constant A, and $(V - \gamma V_b)$ be another constant B, $$\beta = -R_1C_1\log\left[\frac{A - nS}{B - nS + S}\right] \qquad (27)$$

Evidently the step duration may be made essentially independent of the number of steps if $nS$ is made much smaller than A or B.

Experimental: By means of the circuit shown in FIG. 1, a considerable amount of performance data was obtained on staircase generators such as described by this invention and by varying the circuit parameters, the theory developed above was tested for its applicability to design. The results obtained show that there is sufficient justification for assuming the pnpn diodes as ideal switches, and illustrate the good agreement obtainable between experimental data and theoretically predicted behavior.

The following circuit elements were employed in the diagram of FIG. 1 for the original testing:

$R_1 = 10^5$ ohms; $R_2 = 10^2$ ohms; $R_3 = 10^3$ ohms; $R_L = 10^7$ ohms; $C_1 = 2\times10^{-8}$ farads; $C_2 = 10^{-6}$ farads; $V = 112.5$ volts.

Diode $D_1$ was determined to have a breakover voltage $V_b = 38.5$ volts. Diode $D_2$ had a reverse breakover voltage of 29 volts. Variations of the order of 20% were encountered in the reverse breakover voltages of a random selection from commercially available pnpn diodes and this need be considered in design specifications. The sustaining voltage was determined to be $V_S = 0.7$ volts for diode $D_1$ and $V_S = 0.8$ volts for $D_2$. Using the circuit parameters given above, the step amplitude S was determined for the free running staircase wave generator as: $S = 0.57$ volts. The value of the extinction potential $v'$ was also obtained experimentally as $v' = 8.0$ volts. Using Equation 18:

$$S = \frac{2\times10^{-8}}{2\times10^{-8} + 10^{-6}}(38.5 - 8.0) = 0.61 \text{ volts} \qquad (28)$$

The duration, $\alpha$, of the charging cycle, was found experimentally to be $\alpha = 28$ $\mu$seconds. Equation 23.

$$\alpha = (-10^3\times2\times10^{-8})\log\left(\frac{8.0}{38.5}\right) = 31\ \mu\text{seconds} \qquad (29)$$

The duration of the first step $\beta$ was determined experimentally to be $\beta = 0.72$ millisecond. Using Equation 26:

$$\beta = (10^5\times2\times10^{-8})\log\frac{112.5 - 38.5 - 0.6}{112.5 - 8.59} = 0.7 \text{ milliseconds} \qquad (30)$$

Figure 3:
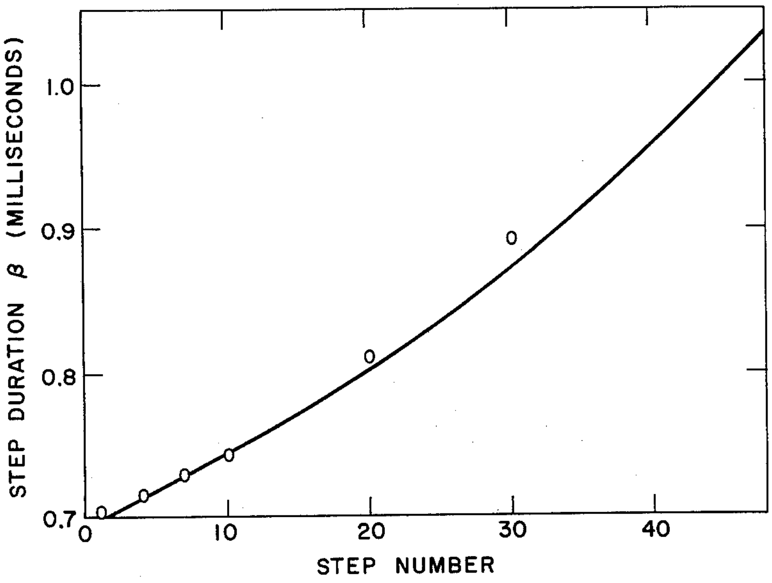
FIG. 3 is a curve illustrating that step duration is a function of the total number of steps.

FIG. 3 shows that the step duration $\beta$ increases as the staircase potential rises. The curve was calculated by means of Equation 26 the points were obtained experimentally. It is readily seen that the agreement is quite good. Since $C_2$ is discharged when $v_2$ is equal to the reverse breakover voltage $V_2 = 29$ volts and $v_2 = nS$ it follows that $C_2$ should be discharged when $n = 49$ steps. Experimentally it was found, however, that the discharge of $C_2$ did not take place until $n = 55$. This could be accounted for by charge leakage from $C_2$ through $R_L$ during the staircase growth. Consequently more steps are needed to reach $V_r$. This had not been taken account in the simple theoretical treatment presented here.

Figure 4:
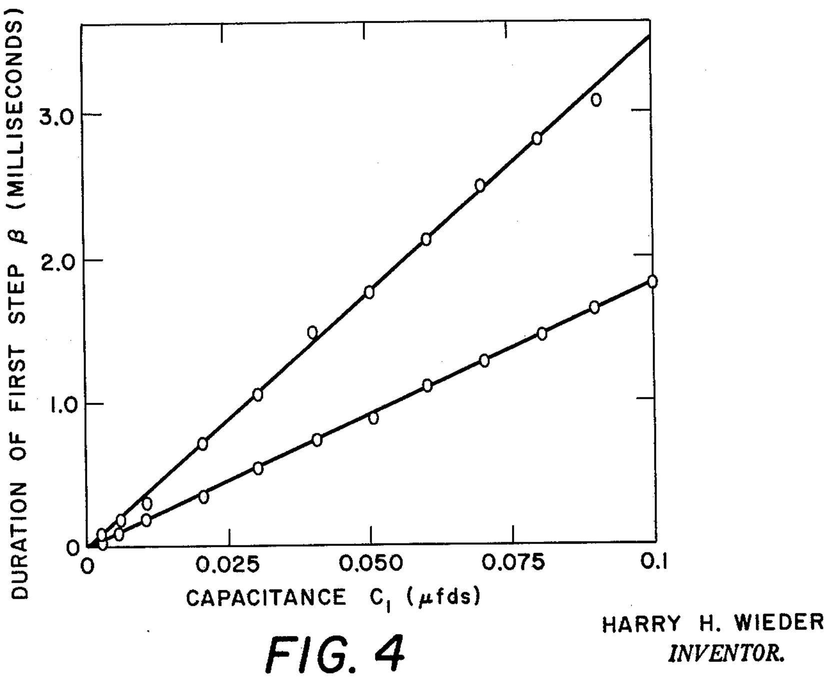
FIG. 4 illustrates of the dependence of the step duration upon the capacitance $C_1$ with resistance $R_1$ as a fixed parameter.

FIG. 4 shows that the step duration $\beta$ is indeed a linear function of capacitor $C_1$ and resistor $R_1$ as predicted provided that the assumptions introduced in the theory are valid. The number of steps per cycle that have been obtained thus far range from 5 to 400 simply by varying the circuit parameters and the correlation between experimental step amplitudes and durations and those predicted from theory, was also found to be very good. The circuit was tested in one continuous run for 24 hours. At the end of this period no change in performance was to be found. Since the pnpn diodes are silicon devices, they have a much better temperature response than germanium transistors. The increase in step duration may be precisely controlled as shown in FIG. 3 by means of auxiliary nonlinear elements. It could also be linearized so that the step length should become a linear function of the step number. This has not been accomplished as yet.

Figure 5:
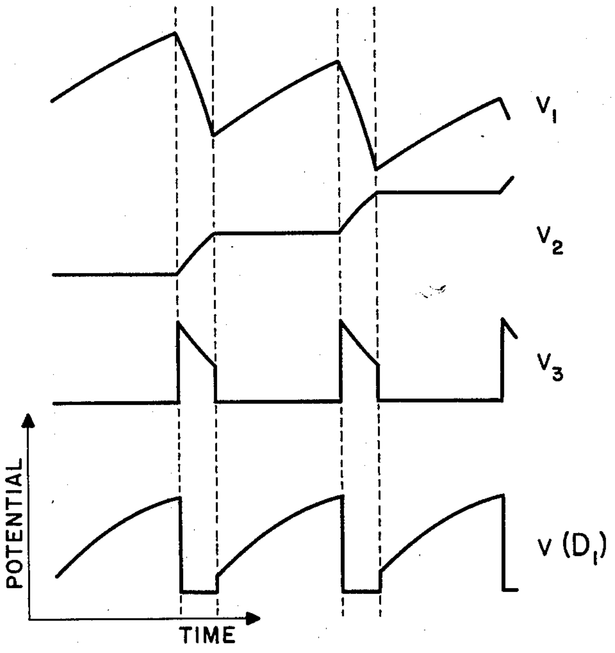
FIG. 5 shows a timing diagram of the instantaneous potentials within the circuit.

FIG. 5 shows a detailed timing diagram of voltage waveforms in the circuit of FIG. 1.

Figure 6:
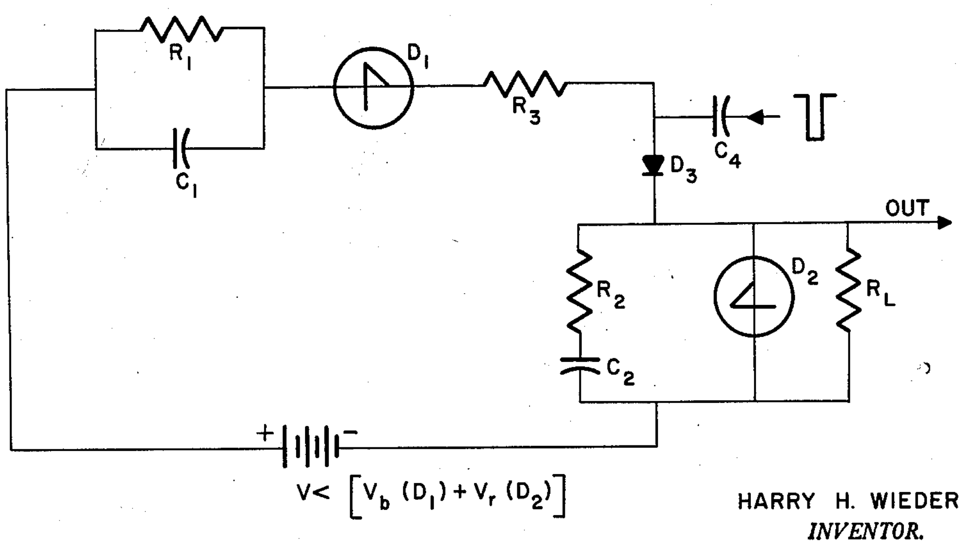
FIG. 6 is another embodiment of the invention showing a modification of the circuit of FIG. 1.

FIG. 6 shows a modification of the circuit of FIG. 1 which allows a triggered and/or synchronized operation of a staircase wave generator. The primary modification in the circuit is the reduction of the supply potential V below the sum of the breakover and reverse breakover voltages respectively of diodes $D_1$ and $D_2$. The capacitor $C_4$ couples a negative pulse whose amplitude A must be large enough so that $(V+A)$ will trigger diode $D_1$ into conduction. At the end of the pulse diode $D_1$ resumes its quiescent state. Again the charge metered into capacitor $C_2$ depends upon the conditions discussed earlier with regard to the free running staircase generator. Care must be exercised, however, that the intervals between successive pulses should not be large enough to lead to an appreciable decay of $v_2$ through $R_L$. The purpose of the normal diode $D_4$ is simply to decouple the load circuit during the application of the triggering pulse. It can be any ordinary diode capable of passing the switching current. An experimental circuit such as shown in FIG. 6 performed quite well with $V=60$ volts, $C_3=0.05$ $\mu$fds, $D_3=$1N34 and an applied negative voltage pulse of 0.1 millisecond duration and an amplitude of 50 volts. All other circuit parameters shown in FIG. 1 remained unchanged. The pulse repetition rate was kept between 100 p.p.s. and 1000 p.p.s. with excellent results from the staircase output signal which did not differ from the waveforms shown in FIG. 2. If the supply potential is raised just beyond the operating point, then an applied negative signal to $C_3$ will cause the synchronization of the staircase wave generator again between 100 p.p.s. and 1000 p.p.s. although the upper and lower boundary criteria under which the circuit will perform reliably have not yet been determined.

Fewer component parts are employed in this invention than in previously described staircase generators, and only one power supply source is required, with a very small current drain, as compared to the previously known circuits. The output signal of nearly 30 volts peak is 3 times larger than that obtainable from solid state circuits using unijunction transistors therefore a much greater number of steps may be obtained from the circuit described in this invention.

Due to the wide range of $V_b$ available in commercially obtainable pnpn diodes various combinations may be put together to provide a particular staircase function. For example, a circuit has been used employing for $D_1$ a diode having a 200 volt forward breakover voltage and for $D_2$ another diode having a reverse breakover of 95 volts with a consequent rise in output voltage.

The increase in the duration of subsequent steps has advantage in circuits where a finite time delay or advancing phase shift is required; such a method has been used in building a sampling circuit for a synchronous detector. Also, the use of pnpn diodes in the present circuits permits better matching of design criteria with theory due to the inherently better performances of these diodes compared to transistors in acting as near ideal switches.

The circuit as shown in FIG. 1 may be altered to fit some special conditions. Thus, assuming that it is desired to change $C_2$ to some predetermined value $v_2$ less than the reverse breakover voltage of $D_2$, this may be accomplished easily by inserting a pulse transformer in series with $D_2$ a positive pulse applied to the primary will, if it is of sufficient amplitude, trigger $D_2$ into conduction thus discharging $C_2$.

Staircase generators of the present invention may be cascaded to provide large scale frequency division and may also be used for television rasters. Three such cascaded circuits have been tested, thus far, but this is not to be considered a limitation on the number that may be used.

Obviously many modifications and variations of the present invention are possible in the light of the above teachings. It is therefore to be understood that within the scope of the appended claims the invention may be practiced otherwise than as specifically described.

What is claimed is:

1. An improved staircase wave generator circuit comprising:

(*a*) a voltage supply having one side thereof connected to a point of ground potential, (*b*) a first capacitor and a first resistor in parallel and connected between the other side of said voltage supply and one terminal of a first P-N-P-N type semiconductor device, (*c*) a second P-N-P-N type semiconductor device having one terminal connected to said point of ground potential, (*d*) a current limiting second resistor being connected between the other terminal of said first semiconductor device and the other terminal of said second semiconductor device, (*e*) a second capacitor and a current limiting third resistor in series connected across said second semiconductor device, (*f*) the output from the circuit taken from across said second semiconductor device, (*g*) the supply voltage from said voltage supply being greater than the sum of the breakover voltages of said first and second semiconductor devices, wherein with said voltage supply applied to the circuit the voltage across said first P-N-P-N diode will be higher than its breakover voltage causing said first diode to switch to its low impedance state and said second P-N-P-N diode which is shunted by said second capacitor will remain open, said first capacitor will charge in series with said second capacitor until the voltage across said first diode drops below its sustaining voltage to conduct at which time said first diode will switch back to its high impedance condition thus trapping a charge on said second capacitor, the charge on said first capacitor discharging through said first resistor, the voltage across said first diode increasing as said first capacitor discharges until its breakover voltage is reached at which time said first diode will switch on and the cycle repeats itself, an increment of charge being added to said second capacitor in a discrete step during each charging cycle giving rise to a voltage rise in the form of a staircase, the ratio of the capacitances of said first and second capacitors controlling the number of steps in the staircase waveform when other circuit parameters are held constant, said second diode switching to its lower impedance state when its reverse breakdown voltage is reached by the voltage charge across said second capacitor and said second capacitor is discharged thus returning the circuit to its original condition.

2. An improved staircase wave generator circuit comprising:

(a) a voltage supply having one side thereof connected to a point of ground potential, (b) a first capacitor and a first resistor in parallel and connected between the other side of said voltage supply and the P-emitter terminal of a first P-N-P-N four layer silicon diode, (c) a second P-N-P-N four layer silicon diode having its P-emitter terminal connected to said point of ground potential, (d) a current limiting second resistor connected between the N-emitter terminal of said first P-N-P-N diode and the N-emitter of said second P-N-P-N diode, (e) a second capacitor having greater capacitance than said first capacitor being connected between the N-emitter terminal of said second P-N-P-N diode and a current limiting third resistor which in turn is connected to the P-emitter terminal of said second P-N-P-N diode, (f) a load impedance across which the output is taken being connected across said second P-N-P-N diode, wherein with said voltage supply applied to the circuit the voltage across said first P-N-P-N diode will be higher than its breakover voltage causing said first diode to switch to its low impedance state and said second P-N-P-N diode which is shunted by said second capacitor will remain open, said first capacitor will charge in series with said second capacitor until the voltage across said first diode drops below its sustaining voltage to conduct at which time said first diode will switch back to its high impedance condition thus trapping a charge on said second capacitor, the charge on said first capacitor discharging through said first resistor, the voltage across said first diode increasing as said first capacitor discharges until its breakover voltage is reached at which time said first diode will switch on and the cycle repeats itself, an increment of charge being added to said second capacitor in a discrete step during each charging cycle giving rise to a voltage rise in the form of a staircase, the ratio of the capacitances of said first and second capacitors controlling the number of steps in the staircase waveform when other circuit parameters are held constant, said second diode switching to its low impedance state when its reverse breakdown voltage is reached by the voltage charge across said second capacitor and said second capacitor is discharged thus returning the circuit to its original condition.

3. A circuit as in claim 2 wherein said voltage supply provides a voltage to the circuit greater than the sum of the breakover voltages of said first and second diodes.

4. A staircase wave generator as in claim 2 for synchronized and triggered operation thereof wherein the supply voltage from said voltage is less than the sum of the breakover voltages for said first and second diodes and means is provided for supplying a negative pulse to the circuit between said second resistor and said second P-N-P-N diode, said pulse plus said supply voltage being large enough to trigger first diode into conduction, and at the end of said pulse said first diode resuming its quiescent state.

5. A circuit as in claim 4 wherein an ordinary third diode is provided for decoupling the load portion of the circuit during the application of said triggering pulse.

6. A circuit as in claim 2 wherein the supply voltage is less than the sum of the breakover voltages for said first and second diodes and means is provided for supplying a pulse to said circuit of such amplitude that the sum of said supply voltage plus said pulse is large enough to trigger said first diode into conduction, said first diode returning to its quiescent state at the end of said pulse.

7. An improved staircase wave generator circuit comprising:

(a) a voltage supply having one side thereof connected to a point of ground potential, (b) a first capacitor and a first resistor in parallel and connected between the other side of said voltage supply and the P-emitter terminal of a first P-N-P-N four layer silicon diode, (c) a second P-N-P-N four layer silicon diode having its P-emitter terminal connected to said point of ground potential, (d) a current limiting second resistor connected in series with said first and second P-N-P-N diodes, (e) a second capacitor for greater capacitance than said first capacitor being in series with a current limiting third resistor, said second capacitor and third resistor in series being connected across said second P-N-P-N diode, (f) a load impedance across which the output is taken being connected across said second P-N-P-N diode, wherein with said voltage supply applied to the circuit the voltage across said first P-N-P-N diode will be higher than its breakover voltage causing said first diode to switch to its low impedance state and said second P-N-P-N diode which is shunted by said second capacitor will remain open, said first capacitor will charge in series with said second capacitor until the voltage across said first diode drops below its sustaining voltage to conduct at which time said first diode will switch back to its high impedance condition thus trapping a charge on said second capacitor, the charge on said first capacitor discharging through said first resistor, the voltage across said first diode increasing as said first capacitor discharges until its breakover voltage is reached at which time said first diode will switch on and the cycle repeats itself, an increment of charge being added to said second capacitor in a discrete step during each charging cycle giving rise to a voltage rise in the form of a staircase, the ratio of the capacitances of said first and second capacitors controlling the number of steps in the staircase waveform when other circuit parameters are held constant, said second diode switching to its low impadance state when its reverse breakdown voltage is reached by the voltage charge across said second capacitor and said second capacitor is discharged thus returning the circuit to its original condition.

No references cited.